(12) United States Patent
Bunnell

(10) Patent No.: US 6,192,405 B1
(45) Date of Patent: Feb. 20, 2001

(54) METHOD AND APPARATUS FOR ACQUIRING AUTHORIZED ACCESS TO RESOURCES IN A DISTRIBUTED SYSTEM

(75) Inventor: Karl Lee Bunnell, American Fork, UT (US)

(73) Assignee: Novell, Inc., Provo, UT (US)

( * ) Notice: Under 35 U.S.C. 154(b), the term of this patent shall be extended for 0 days.

(21) Appl. No.: 09/012,506

(22) Filed: Jan. 23, 1998

(51) Int. Cl.⁷ .................................................. G06F 13/00
(52) U.S. Cl. .......................... 709/225; 709/202; 709/219; 709/313
(58) Field of Search .................................. 709/201, 202, 709/217, 206, 219, 223, 225, 224, 313, 315, 328, 329, 330; 707/10, 100, 103, 104, 501

(56) References Cited

U.S. PATENT DOCUMENTS

| 5,603,031 | 2/1997 | White et al. |
|---|---|---|
| 5,649,194 | * 7/1997 | Miller et al. ............... 707/200 |
| 5,913,025 | * 6/1999 | Higley et al. ............... 707/9 |
| 5,922,074 | * 7/1999 | Richard et al. ............. 713/200 |
| 5,933,826 | * 8/1999 | Ferguson .................... 707/9 |
| 5,944,824 | * 8/1999 | He ............................. 713/201 |
| 6,014,686 | * 1/2000 | Elnozahy et al. ........... 709/202 |

OTHER PUBLICATIONS

Novell, Inc. *Novell Improves Decision–Making, Responsiveness and Competitiveness for Networked Enterprises.*, Jul. 30, 1997.

Novell, Inc. *Novell's Guide to NetWare 4.1 Networks,* Table of Contents and Chapters 3 and 13, J. Hughes et al. 1996.

*Informs–Electronic Forms Automation V 4.1–Designer,* Table of Contents, Chapter 13, Appendices D & I, 1995.

* cited by examiner

Primary Examiner—Viet D. Vu
(74) Attorney, Agent, or Firm—Dinsmore & Shohl LLP

(57) ABSTRACT

A computer system has a management service, such as a distributed directory, having a plurality of objects and an access control mechanism. The computer system also has a resource, such as a data store, with a security system. A first object in the management service represents a requester and a second object represents the resource. A broker has access to the management service and the resource, and is operative to determine whether the first object has rights to access the second object, and if such rights exist, allow the requester to access the resource.

22 Claims, 9 Drawing Sheets

METHOD AND APPARATUS FOR ACQUIRING AUTHORIZED ACCESS TO RESOURCES IN A DISTRIBUTED SYSTEM

TECHNICAL FIELD

The present invention relates generally to managing access in computer systems, and will be specifically disclosed as a method and apparatus for accessing a resource through a distributed directory.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared. For instance, computers are often connected to one another to form a network, such as a local area network ("LAN") or a wide area network ("WAN"), wherein the computers communicate between one another and share resources. While increased interconnectivity is a desirable and powerful utilization of the technological explosion, it also poses a challenge with respect to security. This is particularly true when measured against the ever increasing ability and creativity of saboteurs, hackers and agents attempting to access sensitive information.

Particularly with computer networks, but also with other computer configurations, a variety of different resources can be accessed and used. For example, a given computer may require access to a database, an electronic mail ("e-mail") system, a management system, and other programs or resources. Very often, however, each computer resource has its own unique security system that operates independent of the other resources. Building on the prior example, the database may have its own password system, while the e-mail and management service would have a different password system. As such, someone needing access to each of these computer resources would be required to remember passwords corresponding to each of the resources. Moreover, when that user wanted to access a resource, the user would be required to perform the steps of whatever authentication routine is required of that resource, thus wasting time and energy.

Therefore, there is a need for a method and apparatus where multiple computer resources can be secured and accessed without the attendant problems in the prior art.

SUMMARY OF THE INVENTION

Accordingly, an object of the invention is to provide an improved method and apparatus for managing access to resources in a computer system.

Another object of the invention is to provide a method and apparatus for centralized access control to resources through a management service.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a method in a computer system. A requester requests information from an independent data store. The request is received by a broker. The broker accesses a distributed directory and determines whether a first object representing the requester has rights to access at least a portion of the data store. If such rights exist, the requester is allowed to access the data store.

Another aspect of the invention is a computer system having a management service with a plurality of objects and an access control mechanism. A first object in the management service represents a requester. The first object has rights in the management service controlled by the access control mechanism. A resource has a security system. A second object in the management service represents the resource and access to the second object is controlled by the access control mechanism. A broker has access to the management service and the resource. The broker is operative to determine whether the first object has rights to access the second object, and if such rights exist to allow the requester to access at least a portion of the information in the resource.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
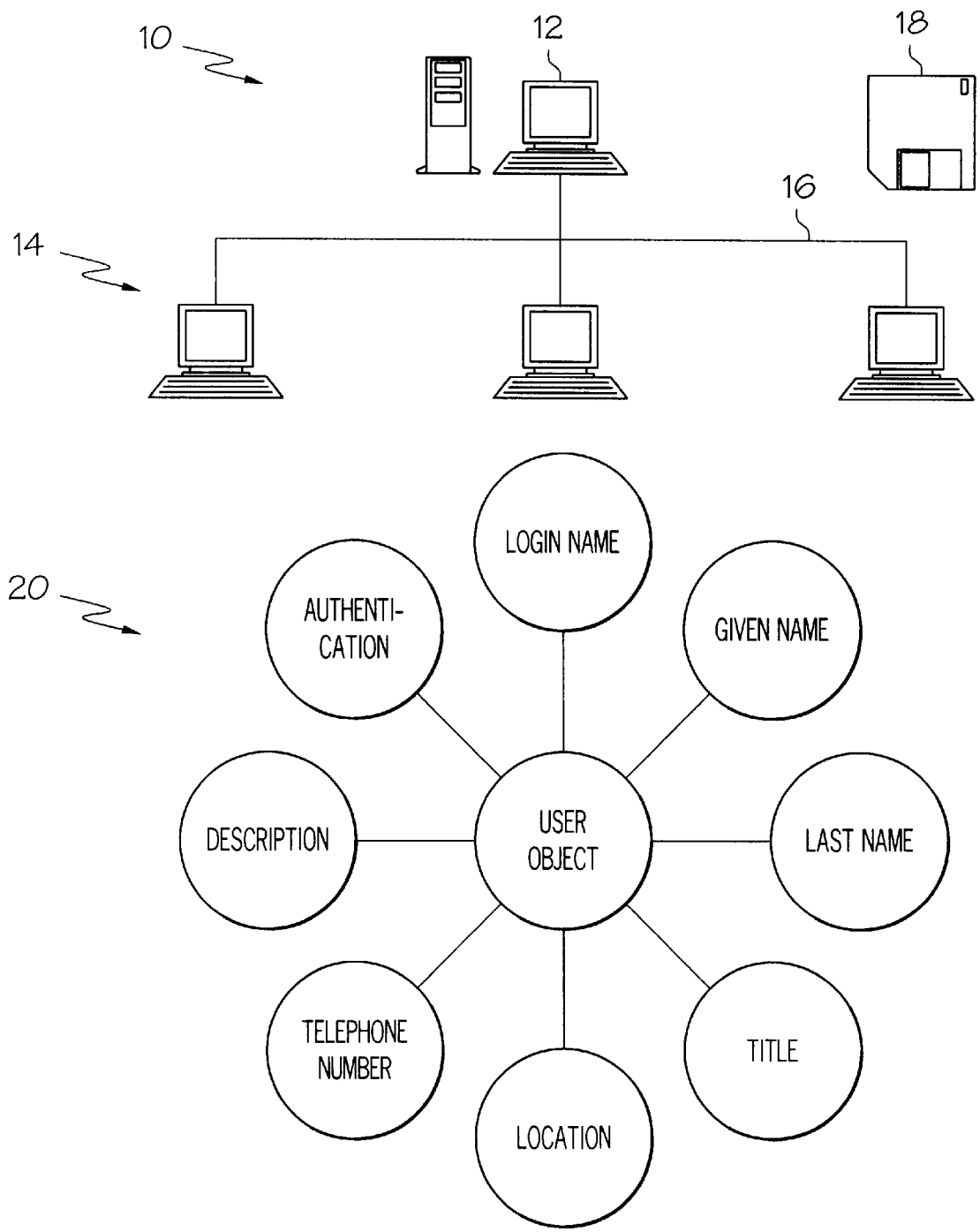
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable medium, which are sometimes described as being nonvolatile, can retain data in the absence of power so that the information is available when power is restored.

When a group of computers are connected to one another, such as in a client/server network, a management service is typically used to organize, administer, and provide access to information and resources across the network. Management services usually access or include a collection of objects that represent a variety of things. For instance, some typical objects represent users, groups, printers, computers, and the like. In some management services, objects are organized in flat domains such as the SECURITY ACCOUNTS MANAGER ("SAM") of WINDOWS NT.

Another type of management service is organized as a synchronized hierarchal database called a distributed directory. One example of a distributed directory is the NOVELL DIRECTORY SERVICES ("NDS"), which is based on the X.500 network services protocol developed and published by the CCITT and Open Systems Interconnection Consortium. Another example of a distributed directory is ACTIVE DIRECTORY SERVICES ("ADS") by MICROSOFT. A distributed directory is an object database as opposed to the traditional relational model under Codd and Date. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

A management service contains a collection of objects, sometimes referred to as identities, with associated attributes or properties. For example, the object 20 is a User object that represents a human user. Beyond representing users, objects represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The object 20 has a variety of associated attributes, such as "Given Name", "Last Name", "Title", etc. Each associated attribute has zero or more values. For example, the value for the property "Given Name" might be "George". An attribute is usually based on an attribute syntax. The data which can be entered as a value associated with the attribute is dictated by the attribute syntax. For instance, NDS version 4.1 includes the following syntaxes: Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown.

Typically, the structure of the distributed directory is governed by a schema. The schema defines the rules for adding and managing objects and attributes of objects in the distributed directory. These rules are specified through a data dictionary that provides a standard set of data types or classes from which objects can be derived or instantiated. The definitions found in the data dictionary can themselves be represented as objects. Each object in the distributed directory belongs to an object class that specifies which attributes are associated with the object. Generally, the schema is extensible so that it may be tailored to modify existing classes or add new classes.

Figure 2:
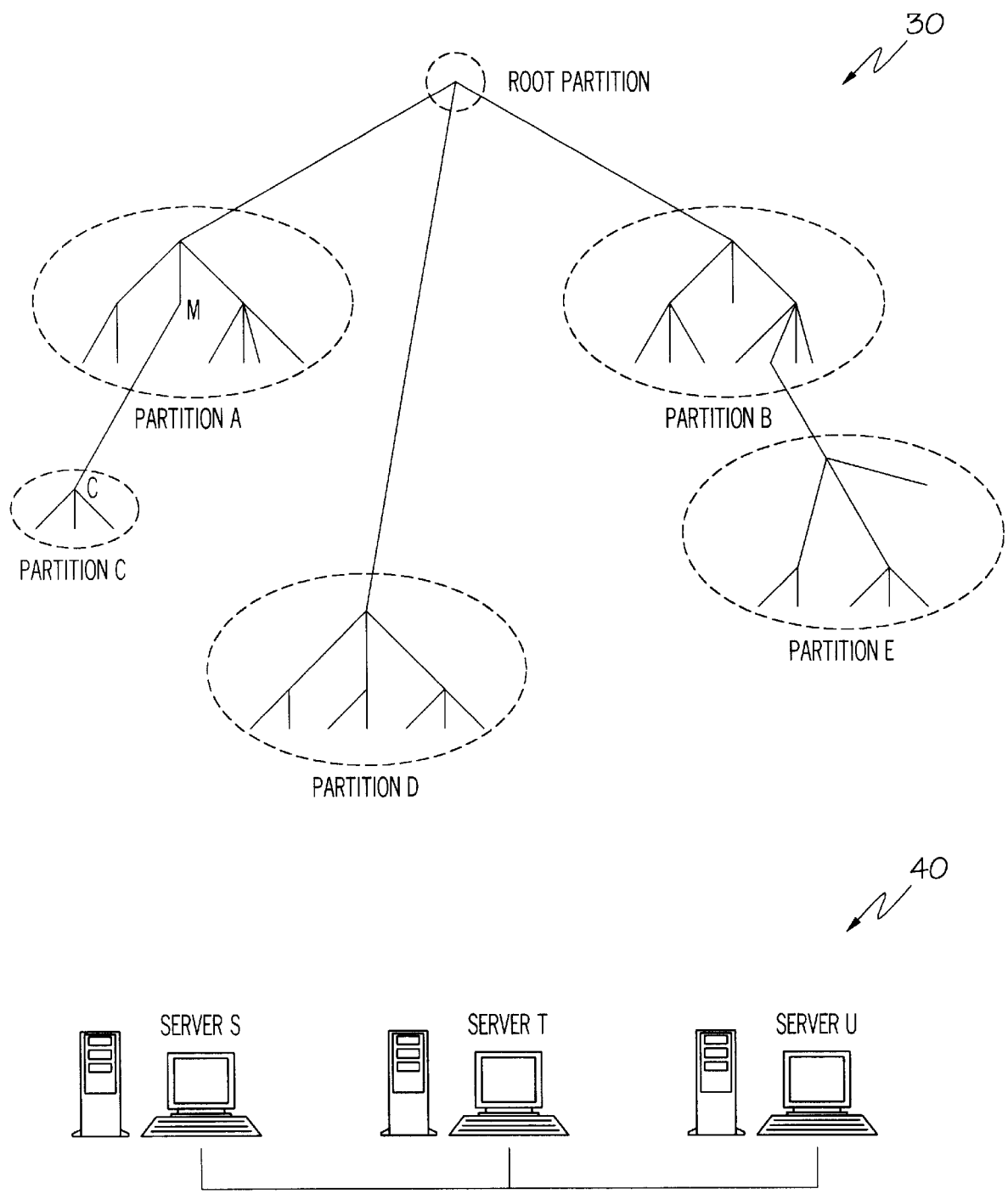
FIG. 2 depicts an example of a distributed directory and several servers accessing the distributed directory.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects As shown in FIG. 2, the objects within the distributed directory 30 are often organized in a hierarchal structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40. Each replica of a partition holds the same set of objects with the same distinguished names ("DN"). The DN is a unique reference that identifies an object's distinct identity and location within a distributed directory. For instance, the DN .CN=Steve*M*.OU=Denali.OU=Parks.O=NW.C=US isolates Steve M's User object to only one object in the entire distributed directory because it contains a unique path of container object names. Since a replica of a partition holds copies of the objects within the partitions, the copies of the objects are also considered replicas and do not constitute distinct objects. The relative distinguished name ("RDN") is the individual name assigned to an object, which must be unique only in relation to the object's superior object. In the above example, the RDN would be "SteveM".

Each insular server node can hold a unique set of partitions and therefore a unique set of objects within that insular node. For instance, the following table demonstrates a sample partition organization in NDS:

|  | Root | Partition A | Partition B | Partition C | Partition D | Partition E |
| --- | --- | --- | --- | --- | --- | --- |
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partition's root most object. Whenever a server holds a complete replica (i.e. Master, Secondary or Read Only) of a partition, but not a directly subordinate partition, it keeps a subordinate reference of the subordinate partition. Referring to FIG. 2 and the above table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different object changes to the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server will get the same result.

When a change is made locally to an entry in the distributed directory, the change is detected and a process in the replication system on the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory.

Figure 3:
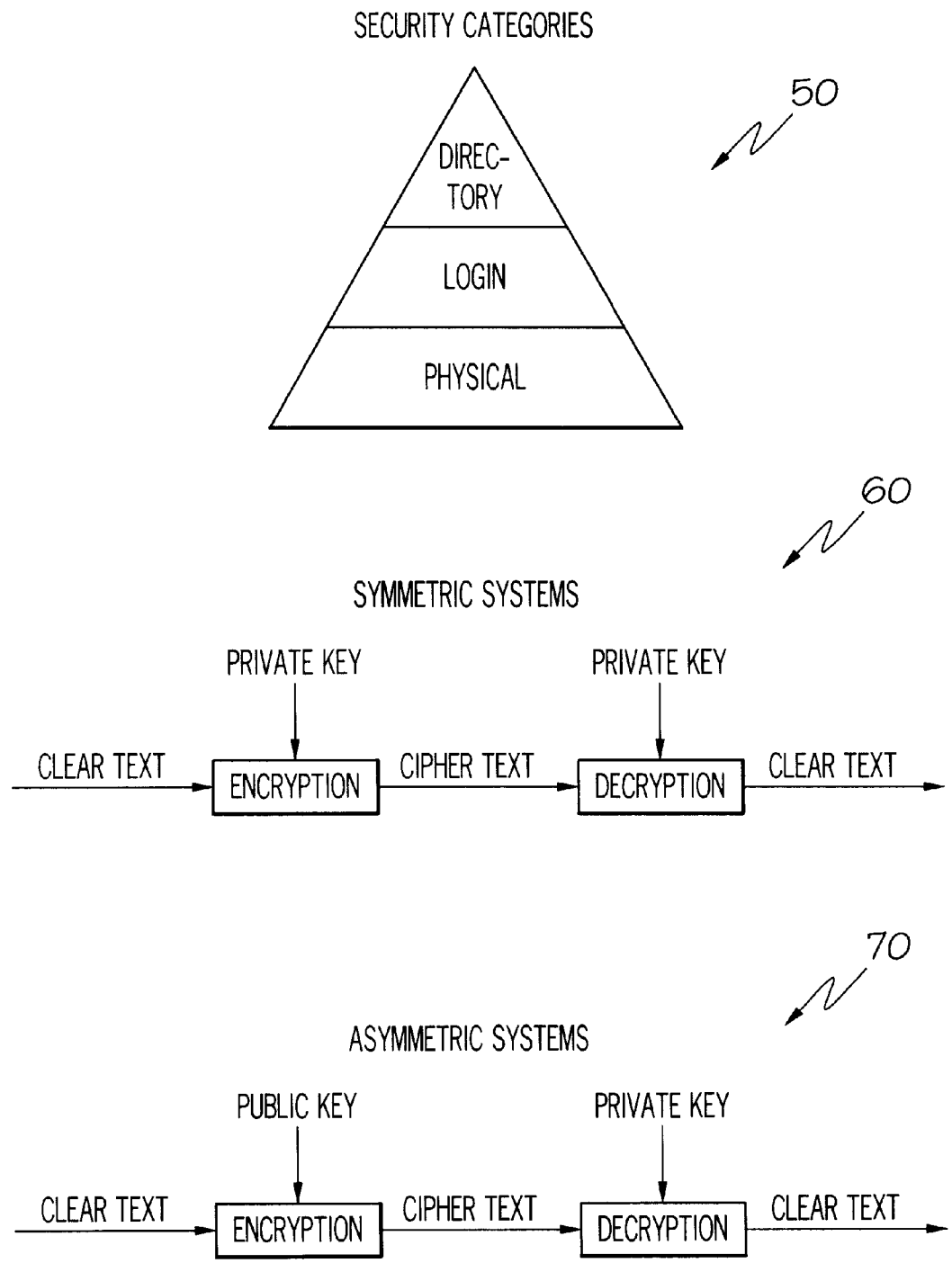
FIG. 3 depicts an access control mechanism and two types of encryption systems.

Access to network resources and objects can be regulated to preserve security. This is particularly desirable as networks become larger and hold more important information. Most management services, such as NDS, have a robust access control mechanism. The access control mechanism 50 represented in FIG. 3 illustrates three examples of network security: physical security, login security, and directory security. Each of these examples of security regulate access to a network and its resources, and can be used independently or in conjunction with one another, or with other forms of security. As the name implies, physical security refers to limiting physical access to a given network resource. For instance, servers in a client/server network are often maintained in a locked room with limited access. As a further example of physical security, a file server console or a workstation can be locked requiring a password or key to access or utilize the server or workstation, respectively.

Login security can vary greatly from one computer system to the next. One form of login security comprises a login phase and an authentication phase. The login phase typically involves prompting a source (such as a user, a program, a resource, etc.) which is attempting to enter the system for a name and a password. After successfully proving knowledge of the password, the source receives an encrypted private key from a server. Next, a credential is used in conjunction with the private key to generate a signature. In the authentication phase, the public key of the server is read by the source. The signature and credential generated during the login phase is used to create a proof, which is sent to the server. The proof is verified by the server through a computation using the source's public key stored in the source's object. If the proof is correct, then authentication is successful and the source is allowed access to the system. After successfully completing the authentication phase, the source has "logged in" the system and is represented by an object identity on the distributed directory. The login phase is typically performed only once. However, if, for example, a connection needs to be made to other network servers, the authentication phase can be repeated through a process known as background authentication. This involves subsequent verification by servers using the proof and the public key without additional intervention by the source.

Directory security is usually used in conjunction with login security, where directory security is not used unless login security has been first verified. While directory security can vary greatly, it generally comprises two parts: file system security and object security. File system security provides access control to files and directories, and basically involves assigning trustee rights and file/directory attributes. Trustee rights assignments can be granted to any object in the distributed directory including container objects, user objects, group objects, and organization roles. Examples of such rights include access control, supervisor, read, write, create, erase, modify, and file scan. In contrast, file/directory attributes control what actions can or cannot be taken on a file or directory. For example, certain files could be flagged as "read only" and "shareable" to prevent any unintentional or intentional deletions of such files or directories.

On the other hand, object security provides access control to directory objects and associated operations. Object security generally includes object rights, property rights, and access control lists ("ACL's "). Object rights are granted to a particular object to access or manage another object. Examples of such rights include supervisor, browse, create, delete, and rename. In contrast, property rights enable a trustee to view or change the values of a particular object's properties. A trustee could have rights to certain properties or to all properties of a particular object. For example, the supervisor property right over an object grants supervisor privileges for all properties in that object. All other rights assignments made at the object level, however, are not affected by the property rights. In fact, supervisor rights at the property level do not grant supervisor rights at the object level. Only the reverse is true. The ACL is a special property of every object, which contains trustee assignments for an object and its properties. In one embodiment, an ACL is a tabulated property containing three entries: the trustee ID, the type of access (i.e. object or property), and the actual rights assignment. A user object, for example, with the write right to the ACL of another user object has what is known as "managed rights" over the user object. This means that an object with the write right of an object ACL can make any rights assignments to that object.

FIG. 3 also illustrates two examples of encryption and decryption systems 60, 70. Generally, such systems scramble clear text (e.g. a textual message, a document, a program, a secret code, etc.) into cipher text which is unusable, unrecognizable, and is very difficult to transform back into the original clear text without the use of a secret key. The secret key is analogous to a physical key that is used to lock a pad lock: to decrypt the cipher text, the corresponding secret key must be used. Symmetric systems 60 are the most common type of systems. They are known as symmetric because the same private key is used for both encryption and decryption. Clear text and a private key are entered into an encryption system, which transforms the clear text into cipher text. If the same private key is introduced with the cipher text to a decryption system, the identical clear text will result. Typically, the symmetric keys are changed often to preserve security. Some of the more common symmetric systems are RC2, RC4, and the Data Encryption Standard ("DES").

The asymmetric system 70 uses two different keys: a public key and a private key. The private key is kept private by the owner of the private/public key pair and the public key is typically distributed or published to anyone who requests it (often by means of a certificate). The public key is used to encrypt clear text into cipher text, and the private key is used to decrypt the cipher text back into clear text. The asymmetric systems tend to be significantly slower than the symmetric systems. One of the most common asymmetric system is the RSA Public-Key Cipher.

Figure 4:
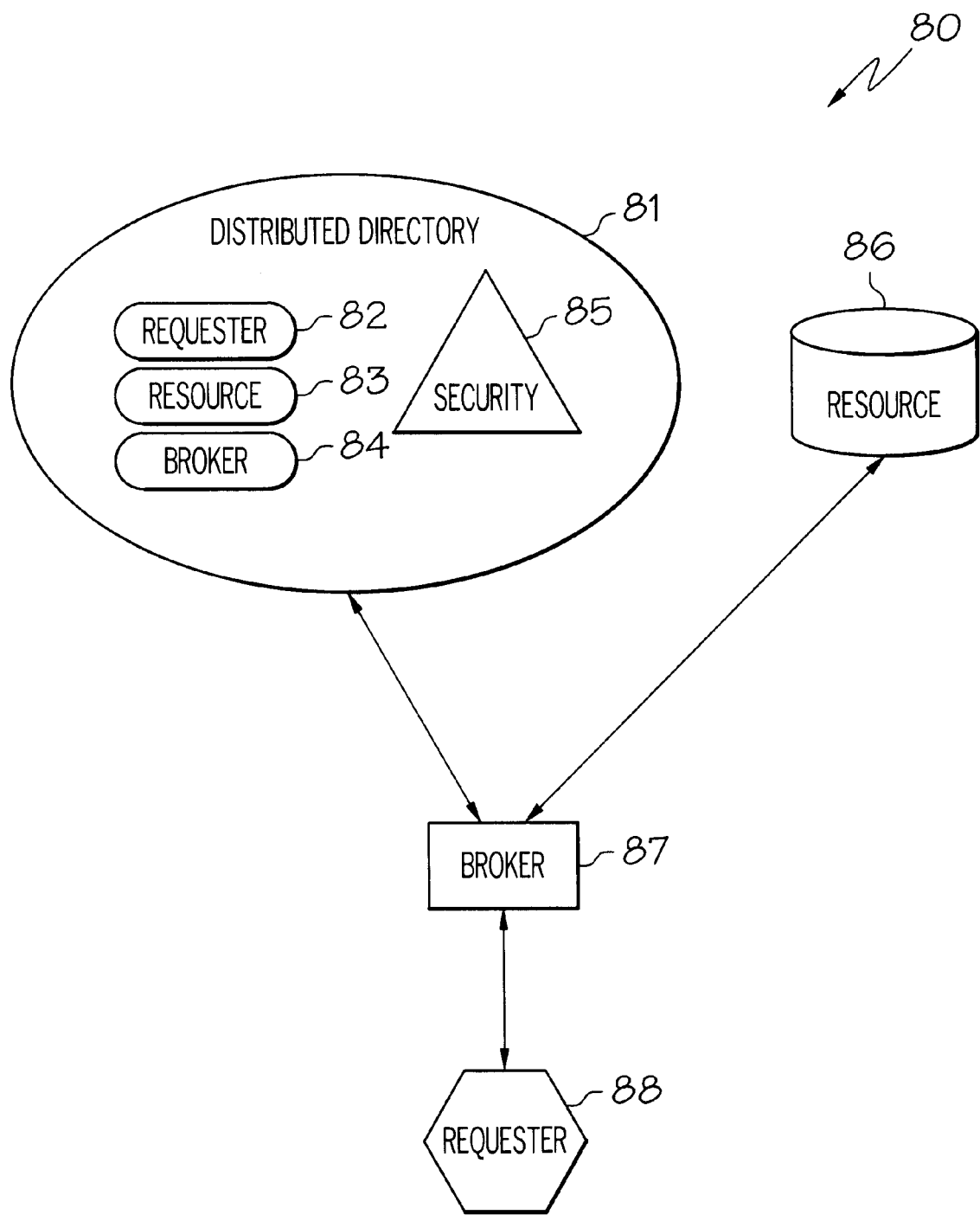
FIG. 4 depicts a computer system and the interrelationship between a requester, a broker, a management system, and a resource.

FIG. 4 illustrates a computer system embodying the present invention. The computer system 80 comprises a management service 81, a resource 86, a broker 87 and a requester 88. In this embodiment, the management service 81 is a distributed directory having a plurality of objects 82, 83 and 84, and an access control mechanism 85, such as directory security. One or more objects 82 represent the requester 88, one or more objects 83 represent the resource 86, and one or more objects 84 represent the broker 87. The resource 86 can take a variety of forms, including for instance a database, a file system, a program, a server, a printer, and the like. The resource 86 optionally has its own access control mechanism. Likewise, the requester 88 can take a variety of forms, including for instance a computer, a program, a user, another resource, and the like.

The broker 87 has access to the management service 81 and the resource 86, and can communicate, either directly or indirectly, with the requester 88. The broker 87 will typically take the form of a program having a series of instructions operative to determine from the management service 81 whether the requester object 82 has rights to access the resource object 83. In many management services, for the broker 87 to be able to reference the management service 81, the broker 84 needs to be logged in and represented as an object 84. In such a configuration, the broker object 84 preferably has suitable rights to read at least a portion of requester object 82 and/or the resource object 83 to determine if access rights exist for the requester object 82. If such rights exist, the instructions in the broker 87 are further operative to allow the requester 88 to access the resource 86. Should the resource 86 have its own access control mechanism, the broker 84 preferably has either directly or indirectly, has appropriate rights to access the resource 86.

Figure 5:
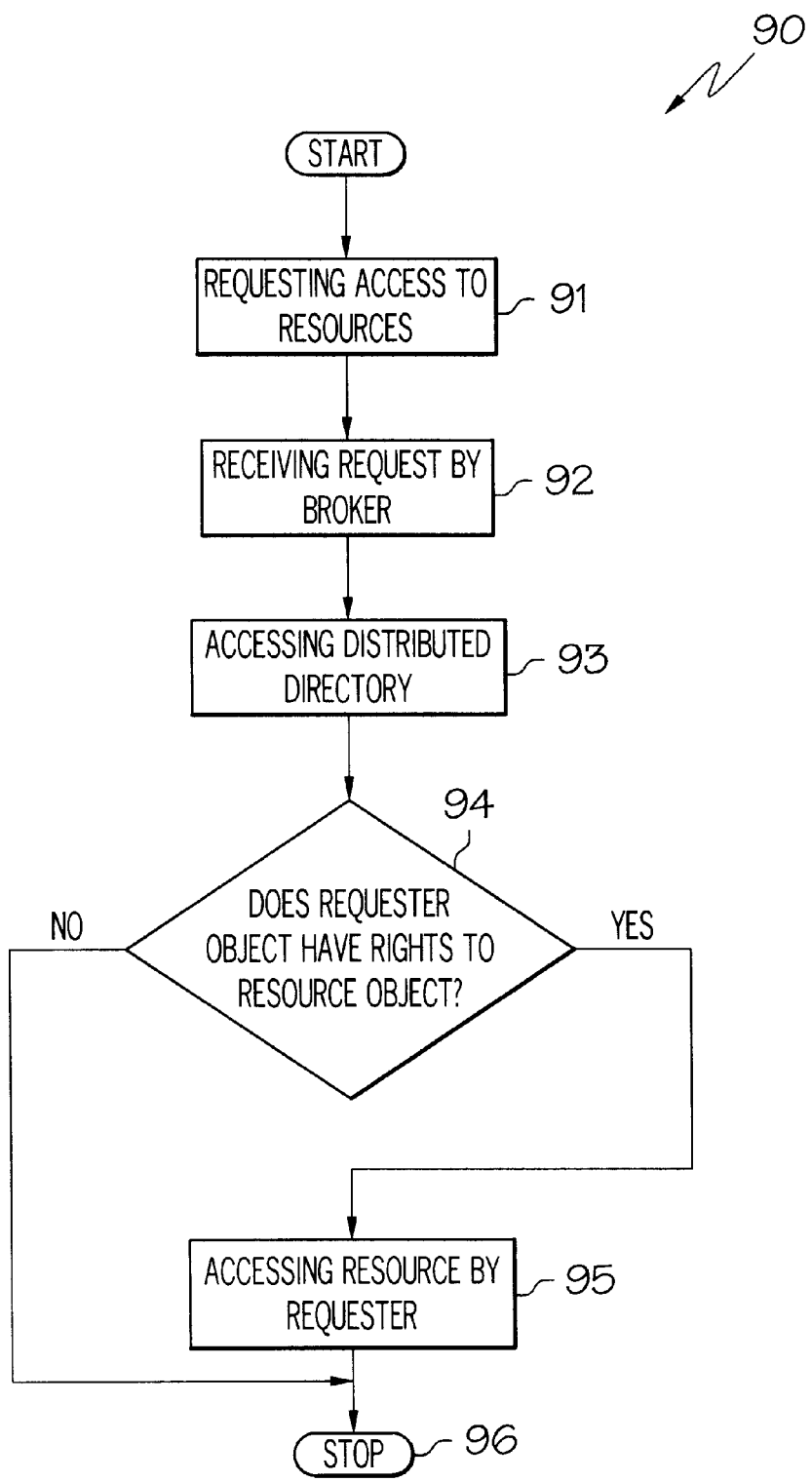
FIG. 5 depicts a flow chart of steps performed by the computer system of FIG. 4.

FIG. 5 depicts a flow chart 90 of steps performed in the computer system 80. In step 91, the requester 88 requests access to the resource 86. The scope of the request will depend upon the nature of the resource 86, whether is be a data store, a program, a hardware device, or the like. Next, in step 92 the request is received by the broker 87. The request can be directly transmitted from the requester 88 to the broker 87, or through some alternative route, such as from the requester 88 to the resource 86 and then to the broker 87. Next, the broker 87 accesses the management service 81 in step 93, and in step 94 determines whether the requester object 82 has rights to the resource object 83. For instance, such access rights can be determined from the access control mechanism 85 (e.g. object security) or through one or more attributes associated with the requester object 82 or the resource object 83.

If suitable rights exist, the method proceeds to step 95 where the requester 88 accesses the resource 86. Access can be either direct (e.g. the requester 88 directly interfacing with the resource 86) or indirect (e.g. the broker 87 or some other entity acting as an intermediary between the requester 88 and the resource 86). Such access to the resource 86 is preferably commensurate with the scope of the rights determined by the broker 87 from the management service 81. For instance, the requester 88 may have rights only to read from the resource 86. As a further example, if the resource object 83 represents only a portion of the resource 86, the requester 88 preferably accesses only that portion. Alternatively, if the requester object 82 does not have suitable rights in step 94, access is denied and the method ends.

Figure 6:
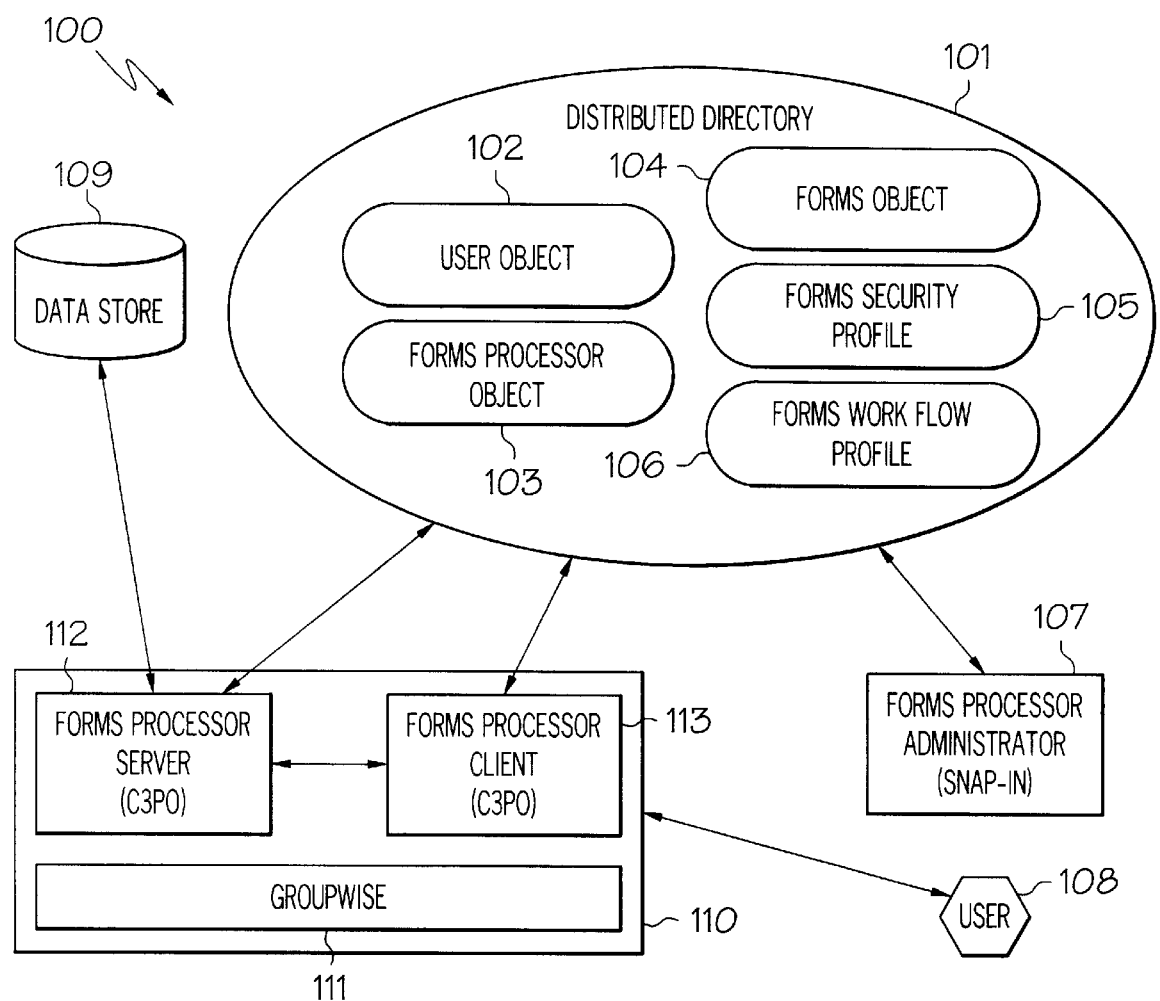
FIG. 6 depicts a computer system and the interrelationship between a user, and e-mail system acting as a broker, a distributed directory, a database, and an administrator program.

FIG. 6 illustrates another embodiment of the present invention. The computer system 100 provides a secure mechanism to access a database by requesting and submitting forms using e-mail transport while leveraging NDS authentication. The system allows any NDS/GroupWise user to request and submit data to the database without requiring an additional authentication of the user to the database. In this embodiment, the database is the PEOPLESOFT HRMS.

The distributed directory 101 is accessed by a plurality of computers on a network. For the purposes of illustration, the distributed directory 101 is NDS. The data store 109 is a relational database on the same computer network, and in this embodiment is independent of the distributed directory 101. The distributed directory 101 and the database 109 each have their own access control mechanisms. The broker 110 is an e-mail system, which in this example is the GROUPWISE program 111 from NOVELL. The GROUPWISE program 111 has been extended to include two modules: the Forms Processor Server 112 and the Forms Processor Client 113. For the purposes of illustration, the requester 108 is a user.

The Forms Processor Administrator 107 is used to create, define and configure NDS components. The administrator 107 is implemented as a 32-bit NWAdmin Snap-in (gwfpsnap.dll). NWAdmin is a user interface to NDS. One with ordinary skill in the art will readily appreciate that NWAdmin is extensible through snap-in computer modules. Technical details are well documented in the publicly available Novell Software Development Kit ("SDK"), which takes the form of a compact disc with libraries of functions and extensive on-line documentation, the entirety of which compact disc is incorporated by reference herein. The administrator 107 is used to create four different NDS objects: (i) Forms Object 104, (ii) Forms Processor Object 103, (iii) Form Security Profile 105, and (iv) Form Workflow Profile 106. Each object represents an extension to the NDS schema class definitions.

The Forms Object 104 contains the definition of a form and represents at least a portion of the information in the database 109. A computer system may contain a multitude of different forms objects, each representing a different form and different portions of the database 109. The administrator 107 provides the capability to define the following information for the form stored in attributes of the object 104:

a. Form text (or form definition)—The form definition is defined in HTML and supports all of the attributes of the standard "Form" tag within HTML. This is implemented a stream attribute in NDS.

b. Form type—There are three support form types: 1) Populated Form—the form is returned with fields populated with data. 2) Empty form—the form is returned with empty fields. 3) View—The form fields are read-only, no data entry is allowed. (SYN_INTEGER).

c. Form activity—additional identifier used by the Forms Processor 112. (SYN_CI_STRING).

d. Form handler—Identifies the form handler to the Forms Processor 112. (SYN_CI_STRING).

e. Form Processor—This points to the "User" object (not shown) that is authenticated as the Forms Processor Server 112. (SYN_DIST_NAME).

f. Forms Processor Object—This points to the Forms Processor Object 103 which contains configuration information for the Forms Processor "User" object. (SYN_DIST_NAME).

g. Form Security Profiles—List of Forms Security Profile objects 105 assigned to this form. (SYN_DIST_NAME).

h. Form Security Access—This is a flag that can be used to override Security Profile objects 105 in the event that the database 109 can be configured to restrict access to other user's data. (SYN_INTEGER).

i. Description—Used by the Forms Processor Client 113 to display a more meaningful description of the form.

j. Locality—Used to describe the location of the Forms Processor Server 112.

The Forms Processor Object 103 is used to store configuration information used by the Forms Processor Server 112. The administrator 107 provides the capability to define the following information for the Forms Processor Object 103:

a. Forms—This is a list of forms objects serviced by the Forms Processor Server 112. (SYN_DIST_NAME).

b. Form Error Contacts—This is a list of NDS "User" objects (GroupWise clients) that will receive a copy of all errors produced by the Forms Processor 112. (SYN_DIST_NAME).

c. Form Handlers—Identifier for any loaded form handlers. (SYN_CI_STRING).

d. Database—Database 109 interface information used by the Forms Processor Server 112. (SYN_CI_STRING).

e. Database type—Database 109 interface information used by the Forms Processor Server 113. (SYN_CI_STRING)

f. Database Operator ID—Database 109 interface information used by the Forms Processor Server 112. (SYN_CI_STRING).

g. Database Password—Database 109 interface information used by the Forms Processor Server 112 to access the database 109. Preferably, the password will grant rights to the entirety of the database 109. Consequently, access to this attribute should be strictly controlled and the server upon which the Forms Processor Server 112 operates is preferably physically secured. (SYN_CI_STRING).

The Forms Security Profiles 105 are used to restrict the users for whom a Forms Processor Client 113 can request and submit data. This object 105 is used to allow a user to request data for someone other than themselves. These objects 105 are associated with Forms objects 104. The administrator 107 provides the capability to define the following information for the Forms Security Profile object 105:

a. Form Security Role Members—This is a list of users that have been granted submit and request rights for other users. (SYN_DIST_NAME).

b. Form Security Managed Users—This is a list of users for whom that the Form Security Role Members can request and submit forms. (SYN_DIST_NAME).

The Form Workflow Profile 106 is used to identify a list of users to receive copies of a completed form. These objects are associated with Form objects 104. The administrator 107 provides the capability to define the following information for the Form Workflow Profile object 106:

a. User—This attribute contains the list of users to receive a copy of a completed form. (SYN_DIST_NAME).

b. Description—Used to hold a description of the profile. (SYN_CI_STRING).

In addition to these new object classes, the administrator 107 also extends the following existing object classes: (i) User, (ii) Group, (iii) Organization, (iv) Organizational Unit, and (v) Country.

The "User" object class is extended to include the following NDS schema attribute class definitions:

a. Forms—This is the list of forms associated with this object. (SYN_DIST_NAME).

b. Forms Browse—This is the list of forms that this object can request and submit forms for. (SYN_DIST_NAME).

c. Employee ID—This is used to store a human resources Employee ID. This is used to reference and retrieve information from the database 109. In addition to these schema extensions, the Forms Processor User (not shown) uses the "Mailbox Location" attribute to store a pointer to the Forms Processor Object 103. This allows the NDS/GroupWise user to load its configuration at load time from the Forms Processor Object 103.

The "Group" object class is extended to include the following NDS schema attribute class definitions:

a. Forms—This is the list of forms associated with this object. (SYN_DIST_NAME).

b. Forms Browse—This is the list of forms that this object can request and submit forms for. (SYN_DIST_NAME).

The "Organization" object class is extended to include the following NDS schema attribute class definitions:

a. Forms—This is the list of forms associated with this object. (SYN_DIST_NAME).

b. Forms Browse—This is the list of forms that this object can request and submit forms for. (SYN_DIST_NAME).

The "Organizational Unit" object class is extended to include the following NDS schema attribute class definitions:

a. Forms—This is the list of forms associated with this object (SYN_DIST_NAME).

b. Forms Browse—This is the list of forms that this object can request and submit forms for. (SYN_DIST_NAME).

The "Country" object class is extended to include the following NDS schema attribute class definitions:

a. Forms—This is the list of forms associated with this object (SYN_DIST_NAME).

b. Forms Browse—This is the list of forms that this object can request and submit forms for. (SYN_DIST_NAME).

These modifications allow forms to be associated with an specific "User" object, "Group", "Organization", "Organizational Unit" or "Country". The administrator 107, in addition to allowing these associations to be configured for each of these objects, also creates an ACL on the Forms object 104 with the "Read" right to all attributes for each association made to a Forms object 104.

The Forms Processor Server 112 is implemented as a GroupWise Custom 3rd Party Object (C3PO), which usually runs on a computer different than the Forms Processor Client 113. One with ordinary skill in the art will readily appreciate that GROUPWISE 111 is extensible. Technical details are well documented in the GROUPWISE SDK, which is a subset of the NOVELL SDK discussed above. The Forms Processor Server 112 is an Ole Automation Server that is loaded when the GroupWise client is loaded. The authenticated GroupWise ID corresponds to the NDS authenticated object.

Figure 7:
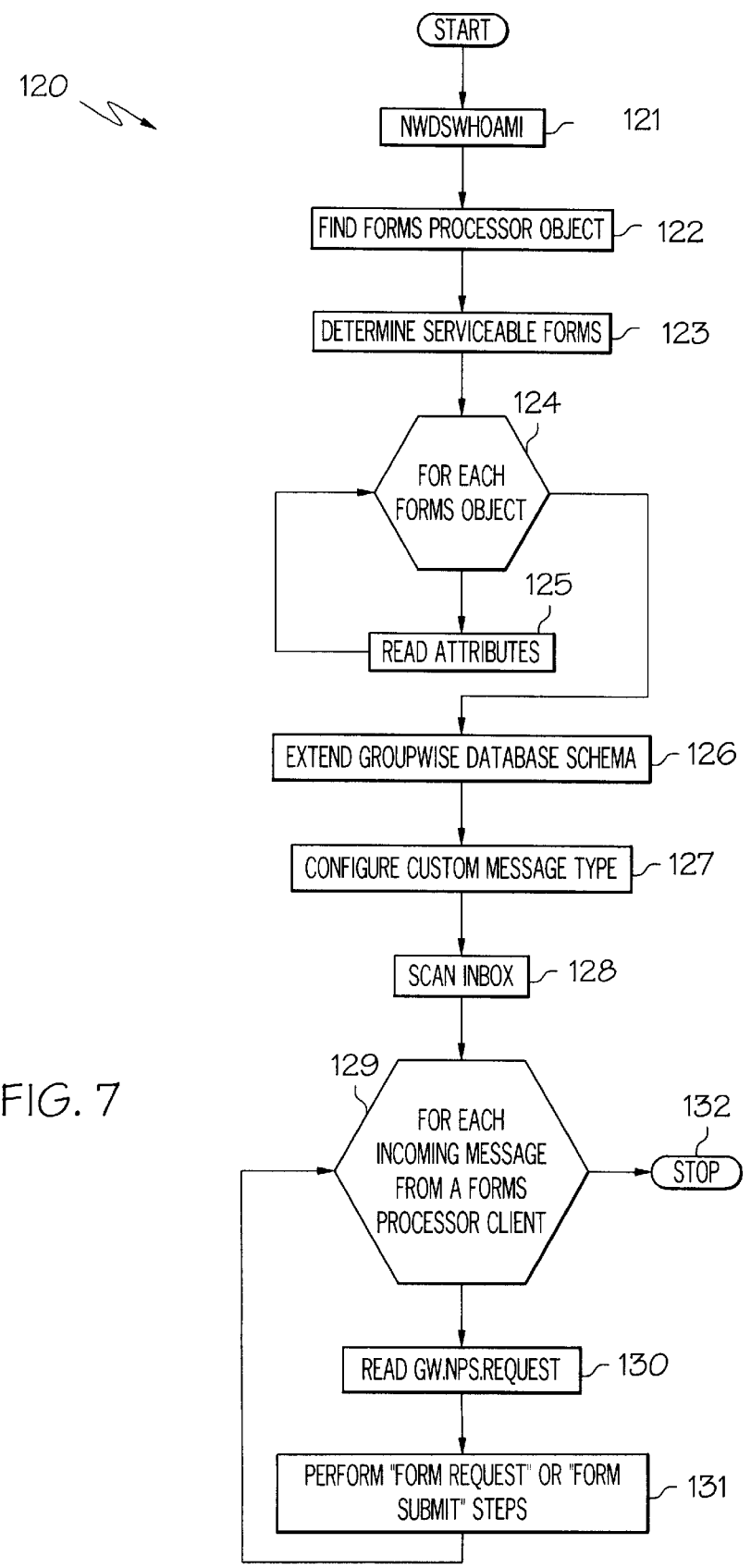
FIG. 7 depicts a flow chart of steps performed by a Forms Processor Server.

When the GroupWise Client loads, it loads the Forms Processor Server 112. The Forms Processor Server 112 is alerted that it has just been loaded and initiates it's own load process. FIG. 7 illustrates a flow chart 120 of steps performed by the Forms Processor Server 112 during the load process. In step 121, the Forms Processor Server 112 determines who the current authenticated NDS object is by issuing the NDS operation NWDSWhoAmI( ). Next, step 122 involves reading the "Mailbox Location" attribute to find the Forms Processor Object 103. At step 123, the "Forms" attribute of Forms Processor Object 103 is read to retrieve the list of forms it is configured to service. In steps 124 and 125, each Form object's attributes is read and stored in memory for quick access. Then, in step 126 the GROUPWISE data store (database schema) is extended to accommodate the following custom field definitions:

a. GW.NPS.ACT—alternate form identifier field.

b. GW.NPS.MSGDEF—field to hold the form name.

c. GW.NPS.SRCHKEY—field to hold the search key (employee id).

d. GW.NPS.FORMDATA—field to hold submitted form data.

e. GW.NPS.HTMLFORM—field to hold requested form data.

f. GW.NPS.REQUEST—field to hold the request type.

g. GW.NPS.REQUESTER—field to identify the requester/submitter.

h. GW.NPS.REQTARGET—field to identify request type (other/self).

i. GW.NPS.OTHERTARGET—field to identify request for other.

Continuing to step 127, a custom message type is configured. This allows the Forms Processor Server 112 to distinguish between messages destined for it and other standard message types such as mail, task, etc. At step 128, the Forms Processor Server 112 drops into "Service" mode. This consists of scanning the InBox for any incoming messages from Forms Processor Clients 113. This process only scans for messages of the configured custom message type. All other types of messages are ignored. In step 129, when messages of the desired type are found, each message is processed in the order in which they were received. In step 130, the value of the GW.NPS.REQUEST field is read to determine what type of request this is. It can be a "Form Request" or "Form Submit". In step 131, the request is processed accordingly.

Figure 8:
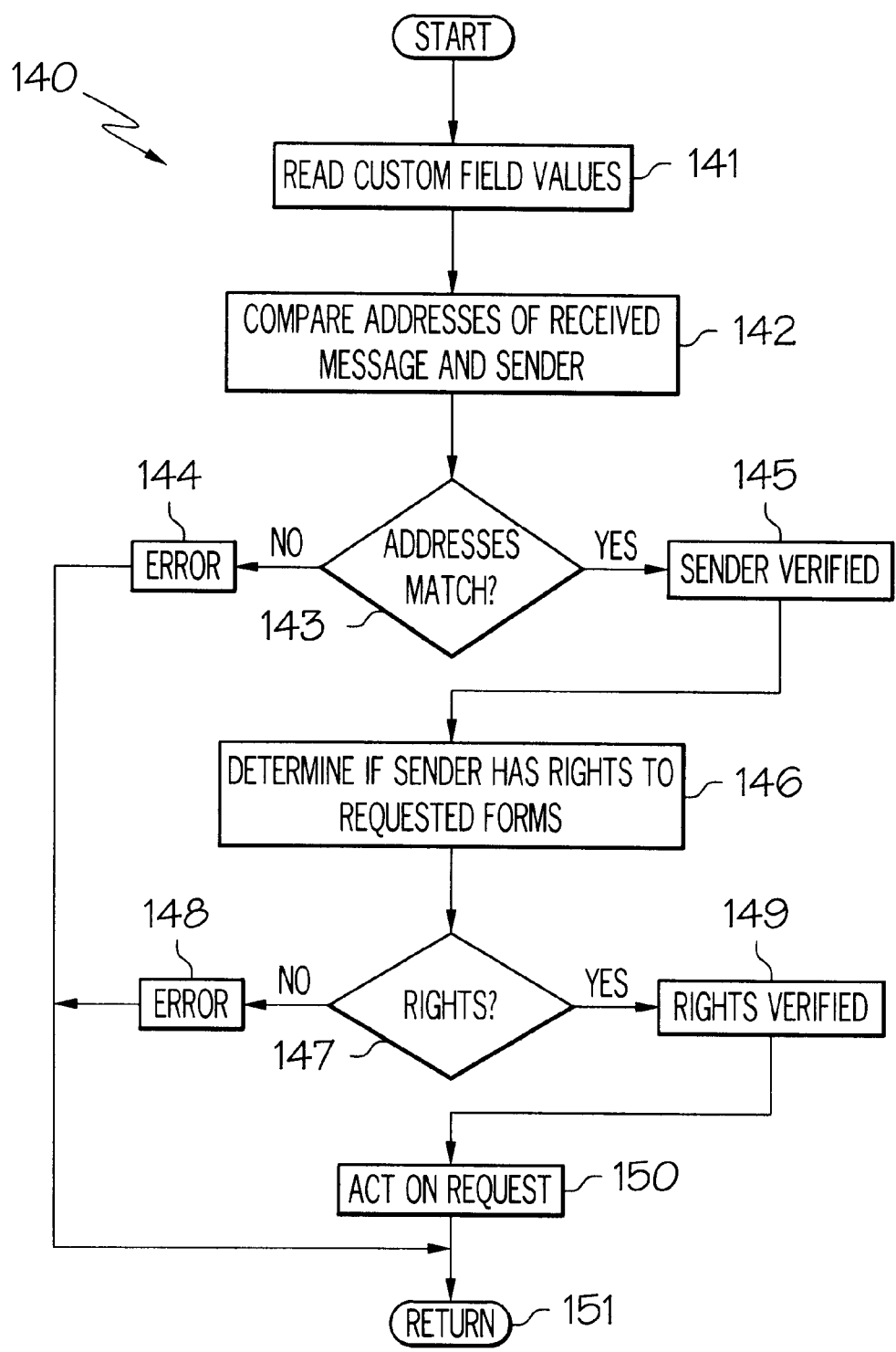
FIG. 8 depicts a flow chart of steps performed by a Forms Processor Server in response to a request.

FIG. 8 illustrates a flowchart 140 of steps performed by the Forms Processor Server 112 in processing a "Form Request" or "Form Submit" request. Optionally, the tree name of the Forms Processor Client 113, which is submitted along with the request, is compared with the tree name of the Forms Processor Server 112 to assure that they are identical. In step 141, all of the message's custom field values (defined in step 126) are read. Then in step 142, the GW.NPS.REQUESTER value is used to verify that the sender of the request is valid. This is accomplished by reading the E-mail Address from the received message and reading the "E-mail Address" property of the requester 108. If they match, then the requester 108 is validated in step 145. If the addresses do not match, an error 144 is issued. Step 146 involves verifying that the user still has rights to the form they are requesting. This is accomplished by issuing a NWDSGetEffectiveRights( ) of the use object 102 for the Forms Object 104 they have requested the NWDSGetEffectiveRights operation determines the access privileges of the user object 102 to the Forms object 104, taking into account the user object's 102 security equivalences, inherited privileges, and inheritance masks. If step 147 determines that such rights exist, the method proceeds to step 149 where the rights are validated. If insufficient rights exist, an error 148 is issued.

In step 150, the request is acted upon. A reference identifier to the Data Store 109, in this case the employee ID attribute of the User object 102, is read to reference appropriate information from the Data Store 109. This reference identifier acts as a link between the identities in the Distributed Directory 101 and the Data Store 109. In the case of a "Form Request", the form type is determined. If the form is a populated form, the Forms Processor Server 112 interfaces with the database 109 to read the appropriate data, populate the form, and send a reply e-mail for delivery to the user 108. The completed form is stored in the GW.NPS.HTMLFORM field of the custom message. In the case of a "Form Submit", the Forms Processor Server 112 writes the submitted form data to the database 109 and sends back a response to the requester 108 indicating success or failure.

Figure 9:
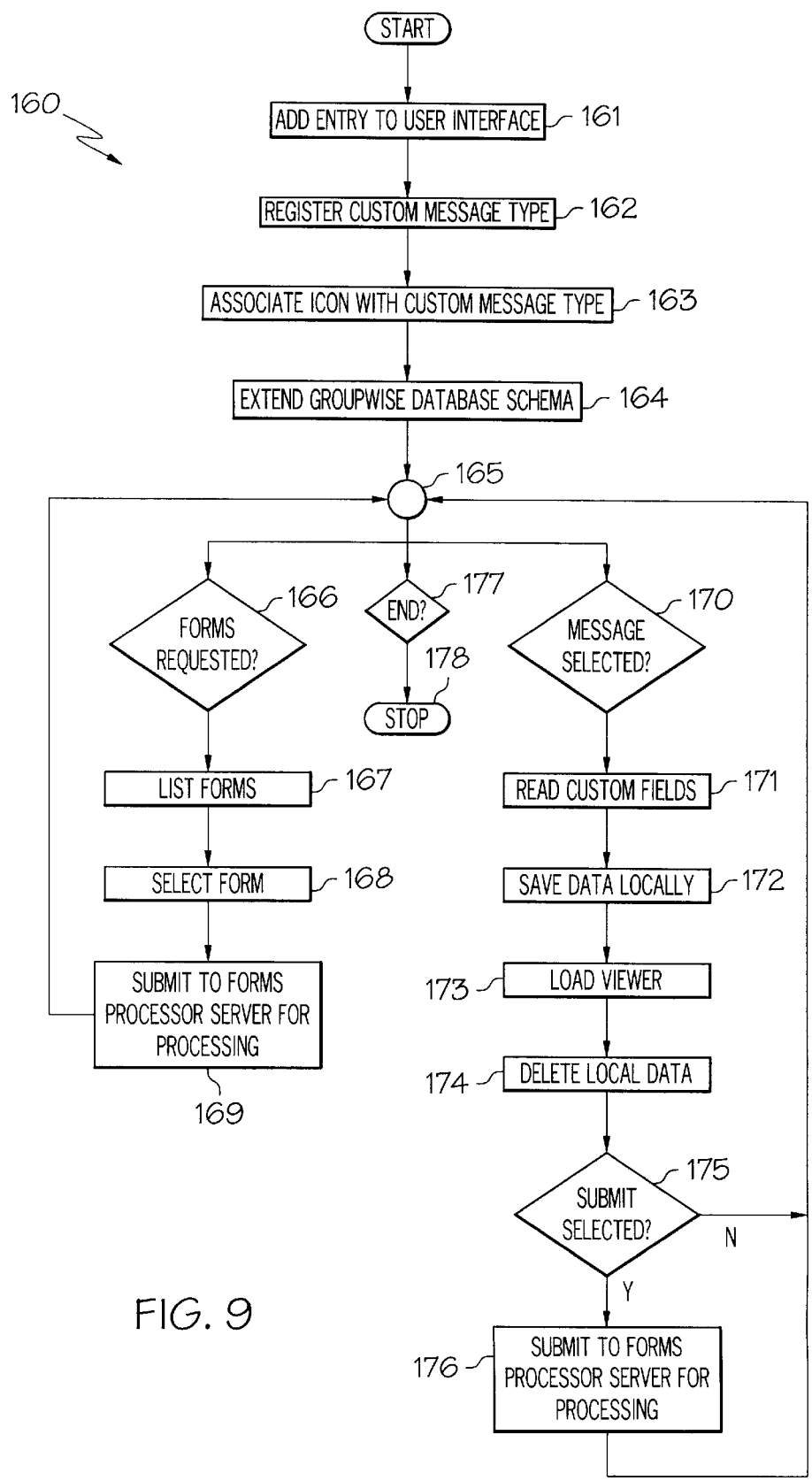
FIG. 9 depicts a flow chart of steps performed by a Forms Processor Client.

The Forms Processor Client 113 is implemented as a GROUPWISE Custom 3rd Party Object (C3PO), which will usually run on a client machine. This is an Ole Automation Server that is loaded by the GROUPWISE Client. When the GROUPWISE Client loads, it loads the Forms Processor Client 113. The Forms Processor Client 113 is alerted that it has just been loaded and initiates it's own load process. FIG. 9 illustrates a flowchart 160 of steps performed by the Forms Processor Client 113 during the load process. In the step 161, an entry is added to the "File" menu and a button is added to the tool bar in the GROUPWISE 111 user interface which allows the user 108 to invoke a "Form Request" dialog. At step 162, the custom message type for the Forms Processor 112 is registered. Then a unique icon is associated with the new custom message type in step 163 to distinguish it from other message types in the InBox. At step 164, the GROUPWISE data store (database schema) is extended to accommodate the following custom field definitions:

a. GW.NPS.ACT—alternate form identifier field.
b. GW.NPS.MSGDEF—field to hold the form name.
c. GW.NPS.SRCHKEY—field to hold the search key (employee id).
d. GW.NPS.FORMDATA—field to hold submitted form data.
e. GW.NPS.HTMLFORM—field to hold requested form data.
f. GW.NPS.REQUEST—field to hold the request type.
g. GW.NPS.REQUESTER—field to identify the requester/submitter.
h. GW.NPS.REQTARGET—field to identify request type (other/self).
i. GW.NPS.OTHERTARGET—field to identify request for other.

In step 165, the Forms Processor Client 113 is in "Service" mode and waits for an appropriate command. When the "Form Request" dialog is invoked in step 166, the Forms Processor Client 113 presents the user 108 with a list of all available forms on the "Form Request" dialog. This involves reading the current authenticated NDS object 102 "Forms" attribute, reading the "Forms" attribute of all the NDS groups the current user is a member, reading each container above the current authenticated object up to the [Root], and place all values in an internal object list. At step 168, the user 108 simply double-clicks the form of interest on the list and the request is submitted in step 169 to the Forms Processor Server 112. The Forms Processor Server 112 processes the request and responds with a custom message type, as discussed above.

The custom message is received in the GROUPWISE InBox as a unique message type represented by it's own icon. The form data is viewed by double-clicking the custom message in the InBox in step 170. The Forms Processor Client 113 is alerted that a custom message it knows how to handle has been selected. At step 171, the Forms Processor Client 113 reads all of the custom field values from the selected message. The GW.NPS.HTMLFORM data is saved to a local file in step 172. Then, a custom viewer is launched in step 173, which consists of an HTML browser for displaying the contents of the form. Once the form is loaded in the viewer, the form file from disk is deleted in step 174. At step 175, if the form contains a "Submit" button and if the button is clicked, the method will proceed to step 176 where the Forms Processor Client 113 submits the form to the Forms Processor Server 112 for processing. Step 176 involves retrieving the field names and field values from the form and placing them in the GW.NPS.FORMDATA custom field of the new submit message. Then, the values of the custom fields in the received message are placed in the custom fields of the new submit message. The new submit message is then sent to the Forms Processor Server 112.

The computer system 100 provides the capability for NDS/GROUPWISE clients to request and submit data from a database 109 while leveraging NDS authentication and using the secure transport of GROUPWISE. A GROUPWISE client with the Forms Processor Client 113 loaded can request to request a form by clicking on the Request Form tool bar button. This launches the Request Form dialog box. Enumerated on this dialog box are the Form objects 104 the user 108 has been granted rights to request. This is accomplished by reading the Form associations from the current authenticated user object 102, the groups this user is member of, and each of the containers above this user object up to [Root]. The user 108 can then request one of the enumerated forms from that dialog.

The NDS Form object 104 contains, as one of it's attributes, the address of the Forms Processor Server 112. The GROUPWISE client uses this address to send the form to the Forms Processor Server 112. The GROUPWISE client with the Forms Processor Server 112 is prepared to process any requests sent to it by requesting clients. Once a request is received, this puts the Forms Processor Server 112 into action. The received message custom fields are read, the request type is determined and the proper action to taken. If the Form type is "Populated Form", the Forms Processor Server interfaces with the database 109 to retrieve the appropriate data for the requesting user. A Form Type of "View" causes the Forms Processor Server 112 to interface with the database 109 and return a form with Read-only fields. An "Empty Form" type is returned immediately with no interface to the database 109 required.

The Forms Processor Server 112 sends the appropriate response to the Forms Processor Client 113. The response message appears as a custom message in the GROUPWISE InBox. The user 108 can then double-click the message to view the form contents. If the form includes a "Submit" button, the fields on the form can be filled by the user 108 and the form submitted to the Forms Processor Server 112 for processing. The Forms Processor Server 112 reads the submitted data from the received message and writes the new data values to the external database. The Forms Processor Server 112 concludes the transaction by responding to the submitter of the form with an acknowledgment message which includes the result of the submission, success or failure.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of catalog services, however, the invention can be used to propagate any information, regardless of the application or syntax. Likewise, the invention has utility in systems other than NetWare, including, for example, Windows NT, Windows 95, OS/2, Macintosh, Vines, Unix, etc. In addition, the invention is applicable to management systems other than NDS, such as SAM, ADS, or STREET TALK by BANYAN. Additionally, the invention is applicable to other e-mail systems other than GROUPWISE and other types of brokers. Accordingly, this invention is intended to embrace all alternatives, modifications, and variations that fall within the spirit and broad scope of the amended claims.

What is claimed is:

1. A method in a computer system having a distributed directory, the method comprising the steps of:
   a) requesting by a requester access to a form, wherein the form is operable to be assembled dynamically from a data store and dynamically interact with the data store;
   b) receiving by a broker the request;
   c) accessing by the broker the distributed directory;
   d) determining from the distributed directory whether a first object representing the requester has rights to access the form; and
   e) if such rights exist, accessing the form by the requester.

2. A method as recited in claim 1, wherein the step of accessing the form comprises the step of displaying at least a portion of the data store to the requester.

3. A method as recited in claim 2, wherein the step of displaying comprises the step of transmitting the form having information assembled from the data store.

4. A method as recited in claim 3, wherein the broker assembles the information from the data store and transmits said information to the requester.

5. A method as recited in claim 3, wherein the step of transmitting comprises the step of sending an electronic mail to the requester with the form embedded therein.

6. A method as recited in claim 5, further comprising the steps of selecting by the requester the electronic mail, and launching a viewer to display the form.

7. A method as recited in claim 1, wherein the step of accessing the form comprises the steps of modifying or adding information to the data store by the requester.

8. A method as recited in claim 7, wherein the steps of modifying or adding information comprises the step of transmitting the form having such modified or added information.

9. A method as recited in claim 8, wherein the requester transmits the form to the broker, and the broker writes the information to the data store.

10. A method as recited in claim 1, wherein step (d) comprises the step of determining whether the first object has access rights to a second object representing the form.

11. A computer readable medium comprising instructions capable of performing the method of claim 1.

12. A computer system, comprising:
   a) a management service having a plurality of objects and an access control mechanism;
   b) a first object in the management service representing a requester, said first object having rights in the management service controlled by the access control mechanism;
   c) a form having a security system, wherein the form is operative to dynamically interact with a data store;
   d) a second object in the management service representing the form, access to said second object being controlled by the access control mechanism; and
   e) a broker having access to the said management service and said form, said broker being operative to determine whether said first object has rights to access said second object, and if such rights exist to allow the requester to access the form.

13. A computer system as recited in claim 12, wherein at least a portion of the form is acquired from the data store.

14. A computer system as recited in claim 13, wherein the form has one or more fields corresponding to at least a portion of information in the data store.

15. A computer system as recited in claim 14, wherein the form is in HTML format.

16. A computer system as recited in claim 14, wherein the form is saved as a value of an attribute associated with the second object.

17. A computer system as recited in claim 16, wherein the data store is a relational database.

18. A computer system as recited in claim 12, wherein the broker is an electronic mail system.

19. A computer system as recited in claim 12, further comprising an administrator program operable at least in part for extending object definitions in the distributed directory.

20. A computer system, comprising
   a) a plurality of interconnected nodes forming a network;
   b) a distributed directory operating on at least one of said nodes, said distributed directory having a plurality of objects;
   c) an access control mechanism in the distributed directory;
   d) a data store independent of the distributed directory, said data store being located on at least one of said nodes and having information;
   e) a first object in the distributed directory representing a requester, said first object having rights controlled by the access control mechanism;
   f) a second object in the distributed directory representing a form operative to be dynamically assembled at least partially from information included in the data store; and
   g) a broker having access to the distributed directory and the data store, said broker being operative to determine from the distributed directory whether the first object has rights to access the second object, and if such rights exist allow the requester to access information included in the data store, such access to information being commensurate with access to the form represented by the second object.

21. A computer system as recited in claim 20, wherein the first object is a user object.

22. A computer system as recited in claim 20, wherein the broker is an electronic mail system.

* * * * *